June 11, 1968  R. FERGUSON ET AL  3,387,637

TUBULAR SAW HEAD

Filed May 12, 1966

INVENTORS
RICHARD FERGUSON &
CHARLES V. HINTON
BY
Channing L. Richards &
Dalbert U. Shefte
ATTORNEYS United States Patent Office 3,387,637
Patented June 11, 1968

3,387,637
TUBULAR SAW HEAD
Richard Ferguson and Charles V. Hinton, Charlotte, N.C., assignors, by mesne assignments, to Terleco, Inc., Charlotte, N.C., a corporation of North Carolina
Filed May 12, 1966, Ser. No. 549,514
6 Claims. (Cl. 143—85)

ABSTRACT OF THE DISCLOSURE

A tubular saw capable of increased operating speeds, feed rates and boring depths, in which regularly spaced teeth are formed with deep intervening gullets in an annular head, the gullets exceeding the tooth profile in area, the cutting edges being angled to reduce the spreading force on the teeth adjacent the deep gullets, and the cutting tip being tapered uniquely to form a clearance kerf while making it possible to sharpen the teeth without disturbing the taper.

---

This invention relates generally to tubular saws of the type used to cut cylindrical billets from log sections or the like, and more particularly to an improved cutting head for such saws by which increased operating speeds, feed rates and boring depths are made practical.

A cutting head embodying the present invention is suited typically for use in tubular sawing apparatus of the sort disclosed by U.S. Patent No. 3,163,190, issued Dec. 29, 1964, which illustrates and describes apparatus for cutting cylindrical billets from a rough log section supported endwise by chucking means arranged to allow rotary indexing as successive working strokes of a tubular saw cut successive billets from the log section. In a sawing operation of this sort it is important that the saw chips formed be kept as large as possible, because they are a valuable by-product for pulping if they are maintained adequately large. Accordingly, for this purpose, the tubular saw cutting head needs to be capable of effective operation at a substantial feed rate and with a relatively small number of teeth. It will appear presently that the illustrated cutting head embodiment of the invention incorporates three teeth and is operable at a feed rate of at least 9/16″ per revolution, which results in chips having a 3/16″ fiber length that are quite satisfactory for pulping.

However, when a small number of tubular saw teeth (such as three) are made to cut at a substantial feed rate to maintain chip size, the sawing force that must be dealt with at each tooth and the provision of adequate tooth strength to withstand this force become critical design factors, both because the sawing force is directed tangentially so as to exert an outwardly directed spreading component on the teeth, and because larger than usual gullet capacity is required between the teeth to accommodate the large chip formation at the higher feed rate. Tooth strength that is adequate in the face of the foregoing circumstances is made possible according to the present invention by maintaining a substantially triangular tooth profile for maximum strength in a manner that allows intervening formation of the aforementioned necessarily enlarged gullets; by forming the teeth to reduce substantially the spreading component of the sawing force applied thereto; and by providing cutting tips for the teeth that can be readily formed with exceptional uniformity so that each tooth bears an equal portion of the cutting load.

Briefly described, the present invention includes a tubular saw having an annular head portion with regularly spaced teeth and deep gullets formed therebetween; with the gullets being made deep by a profile arrangement providing a truncated triangular configuration; with each saw tooth having a cutting tip presenting a cutting edge which is specially angled to reduce the spreading component of the sawing force applied thereto; and with each cutting tip having a novel geometric arrangement including inner and outer side faces conically and coaxially tapered from the cutting edge so as to maintain operating clearance in the annular kerf formed by the tubular saw.

These and other features of the present invention are illustrated in the acompanying drawings in which.

Figure 1:
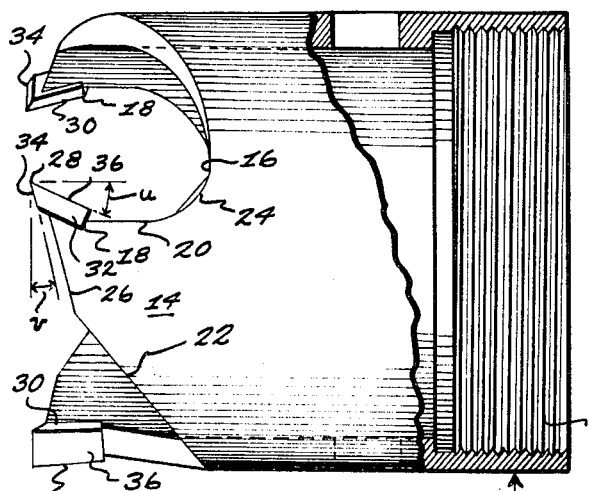
FIG. 1 is a partly sectioned side view illustrating a tubular saw head embodying the features of the present invention.

Referring now in more detail to the drawings, FIG. 1 illustrates an annular saw head generally indicated by reference numeral 10 having one end thereof threaded at 12 for attachment at the extending end of a saw tube (not shown) which may, for example, be of the type disclosed in the aforementioned U.S. Patent No. 3,163,190. The cutting end of saw head 10 comprises regularly spaced teeth 14, three in the illustrated embodiment, separated by deep gullets 16 formed therebetween, each of the teeth 14 having a cutting tip 18 disposed at a positive rake and secured thereto by any suitable method such as a low temperature brazing operation which will not impair tooth strength.

For the reasons already noted, the gullets 16 need to have the largest profile area possible for accommodating the chips cut by the saw teeth 14. However, the depth to which the gullets 16 extend in the saw as well as the overall gullet size are ordinarily limited materially by the strength requirements of the teeth 14. Thus, in conventional teeth formed by a trailing edge which extends diagonally between two leading edges of adjacent teeth, the gullet profile is identical to the tooth profile, and the depth of the gullet is dictated by the required tooth strength. The present invention, however, departs from this conventional relationship and provides a gullet profile which is substantially greater than the corresponding tooth profile without impairing tooth strength.

Figure 3:
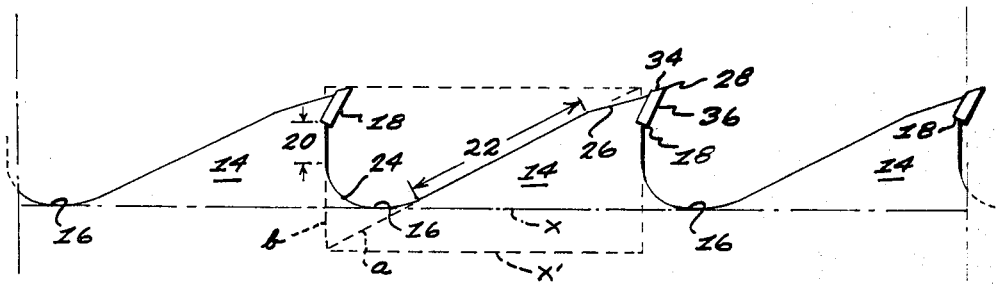
FIG. 3 is a profile development of the teeth of the FIG. 1 saw head illustrating the arrangement of the enlarged gullets and generally triangular tooth profile.

As illustrated in FIG. 3, a representative gullet 16 according to the present invention is defined by a first wall portion 20 extending substantially parallel to the axis of saw head 10 at the leading side of each tooth 14, a second wall portion 22 extending substantially in the relation of a hypotenuse with respect to first wall portion 20 at the trailing side of tooth 14 for a major extent of the tooth spacing, and a third intermediate wall portion 24 extending in truncating relation between said first and second wall portions 20 and 22. A terminal section 26 of the second wall portion 22 is preferably arranged at a decreased slope to provide greater tooth strength at the cutting tip, but the effective extent of the entire wall portion joining the intermediate wall portion 24 and cutting tip 18 is essentially that of a hypotenuse with respect to first wall portion 20. Likewise, the substantially parallel first wall portion 20 may as a matter of choice have an undercut curved configuration so as, for example, to blend with a tangent aligned with leading face of the cutting tip 18 and with the radius or curvature of the intermediate wall portion 24, although the illustrated formation of the first wall portion 20 is preferred.

For comparative purposes, the configuration which would result if the second wall portion 22 extended diagonally between first wall portions 20 is indicated by dotted extension lines $a$ and $b$, respectively. It is apparent that a depth of gullet determined by the intersection of lines $a$ and $b$ at the level $x'$ lies considerably below the level $x$ representing the actual depth of gullets 16 according to the present invention, and would materially lessen the strength of the saw teeth 14. By forming the intermediate wall portion 24 in truncating relation as previously described, a much stronger tooth profile is maintained because gullet depth is limited, while the gullet profile is still made to exceed that of the tooth appreciably. In the illustrated embodiment, the gullet area is approximately 1.5 times the corresponding tooth area, a relationship which has been determined to provide a nice balance between tooth strength and gullet area. However, it will be understood that the depth of gullets 16 could be adjusted in either direction within the scope of the present invention provided the intermediate wall portion 24 extends in truncating relation to first and second wall portions 20 and 22, and provided the second wall portion 22 extends essentially in the relation of a hypotenuse with respect to first wall 20 for a major extent of the tooth spacing. Moreover, while the intermediate wall portion 24 in the illustrated embodiment is curved for the purpose of facilitating chip flow in the gullets 16, it is within the scope of the present invention to provide a flat or differently contoured intermediate wall 24.

Figure 2:
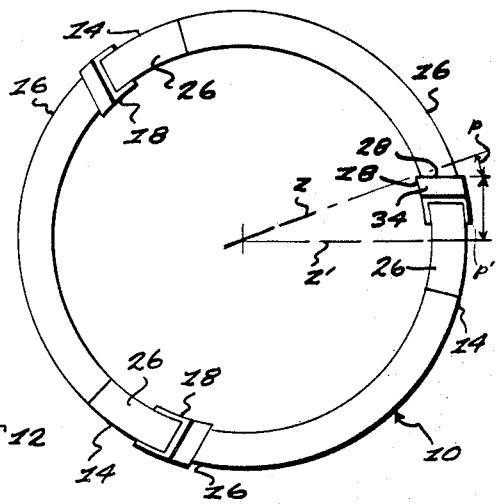
FIG. 2 is a left end view corresponding to FIG. 1.

The aforementioned cutting tips 18 each present a cutting edge 28 which, as illustrated in FIGS. 1 and 2, lies in a plane perpendicular, or substantially so, to the axis of the saw head 10 and which is inclined at an angle $p$ from a radial plane $z$ containing the inner end of cutting edge 28. The cutting edge 28 may in fact also be inclined from perpendicular to the axis of saw head 10 if it is desired to cut the bottom of the kerf at an angle, but the degree of any inclination from such perpendicular relation should be restricted, because inclination of this sort tends to hurt lateral stability of the saw during operation at high feed rates and this tendency becomes more pronounced as the degree of inclination increases. The cutting edge inclination with respect to radial plane $z$, in accordance with the present invention, is in a direction opposite to thhe direction of saw rotation so as to reduce substantially the radial component of the sawing face applied at the cutting edge 28 which otherwise may cause spreading of the teeth 14 or failure, in time, across the base portion thereof.

Figure 4:
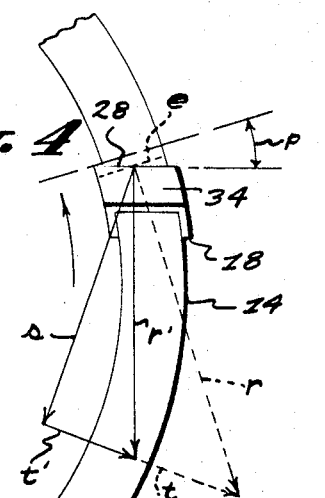
FIG. 4 is a diagrammatic detail of one of the saw teeth illustrating the comparative sawing force vectors acting thereat.

FIG. 4 illustrates generally the extent to which an inclined cutting edge 28 reduces the radial spreading component of the sawing force applied thereat. That is, a sawing force applied to a radially disposed cutting edge as at $e$ would act perpendicularly thereto and produce a reaction force as indicated by a vector $r$ having a first component $s$ directed parallel to a tangent at the center of the circumferential or arcuate extent of a tooth 14 where its greatest strength lies, and a second radial component $t$ representing the spreading force which would be applied to a tooth 14 at a radial cutting edge $e$. By inclining the cutting edge 28 at an angle $p$ with respect to radial plane $z$ as illustrated in FIG. 4, however, the reaction force acting perpendicularly at cutting edge 28 becomes substantially that shown by vector $r'$ which has a first component substantially identical to the previously noted component $s$, but a substantially reduced radial component $t'$ which is approximately half the spreading force component $t$ applied to a radial cutting edge.

Figure 5:
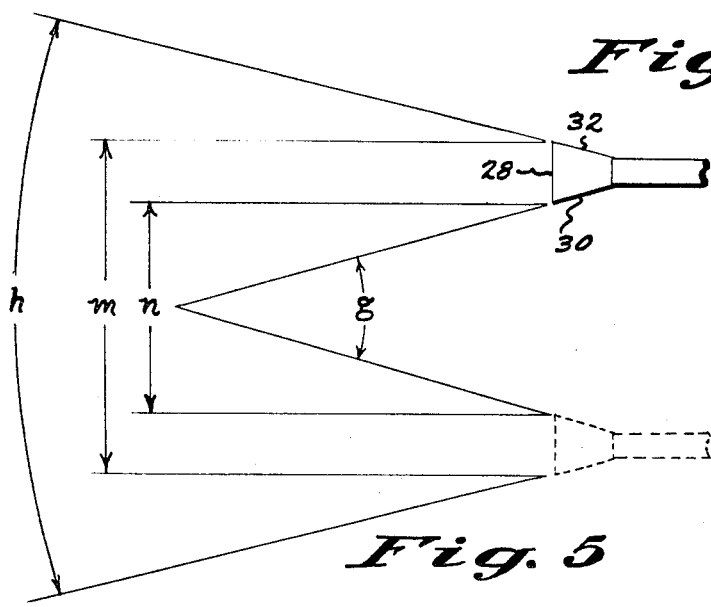
FIG. 5 is a diagrammatic detail of the conically tapered side faces of the cutting tips of the present invention, the cone angles being exaggerated to illustrate more clearly the tapered formation.

In addition to the improved strength characteristics offered by the inclination of cutting edge 28, the special form of cutting tip 18 also contributes to this end through a geometric arrangement that makes it possible to insure tooth uniformity and, therefore, equal sharing of the cutting load between the teeth. This arrangement is characterized by a cutting tip 18 formed with the inner and outer side faces 30 and 32 thereof conically tapered from the end face 34 at the cutting edge 28. The conical tapering is done coaxially with respect to saw head 10 so that side faces 30, 32 extend in converging relation in a direction opposite to saw feed as may be seen best in FIG. 5 where the angle of taper is exaggerated to illustrate the taper formation more clearly. The common reference cones for forming the conical taper of inner side faces 30 and outer side faces 32 are indicated by reference characters $g$ and $h$, respectively, both of which have a cone angle of 6° (exaggerated in FIG. 5) in the preferred embodiment, it being understood that other cone angles can be used if a greater or lesser taper is desired.

The conically tapered inner side faces 30 may be formed conveniently by disposing a conventional grinding wheel interiorly of a chucked saw head 10 with the grinding axis offset from the axis of saw head 10 by an angle equal to the desired cone angle (e.g., 6°), and grinding the several teeth 14 at their inner faces 30 in aligned relation at a common operation, and then rearranging the grinding axis comparably to grind the outer faces 32 commonly in a similar manner. Additionally, the end faces 34 of the teeth 14 are ground so as to be inclined from the perpendicular plane containing cutting edges 28 at an angle $v$ in a direction opposite to the direction of saw feed. This end face inclination $v$, together with the conical taper of side faces 30, 32, results in each end face 34 being relieved from cutting edge 28 to provide clearance behind the cutting edge 28 as it forms a kerf in the work being cut. Also, the leading tooth faces 36 are ground at the rake angle $u$ in a plane that locates the cutting edges 28 at a parallel spacing $p'$ forwardly from a radius $z'$ of the saw head 10 so as to provide the previously mentioned cutting edge inclination angle $p$. Subsequent sharpening of the cutting edges 28 may be done at either the end or leading faces of the teeth 14 without appreciably changing the width of kerf that is cut.

For the purpose of providing an example of a saw head 10 formed suitably in accordance with the present invention, the representative specifications found to provide good results in cutting a round or cylindrical billet having a nominal diameter of 2½ inches are given below:

| Item: | Value |
|---|---|
| Cutting tip rake angle, $u$ _____degrees__ | 24 |
| Inclination of ends face 34, $v$ _____do____ | 15 |
| Inclination of cutting edge 28, $p$ ____do____ | 18 |
| Cone angles of reference cones $g$ and $h$ do____ | 6 |
| Maximum cutting edge diameter, $m$ inches__ | 3.546 |
| Minimum cutting edge diameter, $n$ __do____ | 2.782 |
| Minimum gullet depth _____do____ | 1¼ |
| Ratio of gullet profile area to tooth profile area _____ | 1.5 |
| Feed rate of saw ____inches per revolution__ | 9/16 |
| Number of teeth 14 _____ | 3 |

In a tubular saw head 10 of the sort provided by the present invention, three teeth 14 employ the novel features involved to the best advantage, for an increased number of teeth necessarily reduces the size of by-product chips produced at any given feed rate, while a lesser number of teeth make it more difficult to provide for lateral stability of the saw during its working stroke. Besides the improved feed rate possible with a saw head 10 embodying the features that have been described above, these same features allow higher operating speeds and greater boring depths because of the keen and balanced cutting obtained readily with teeth 14 of the form provided.

The present invention has been described in detail above for purposes of illustration only and is not intended

We claim:

1. A tubular wood saw capable of substantially improved operating speeds, feed rates and boring depths, said tubular saw including an annular head portion having regularly spaced teeth and deep gullets formed therebetween; said gullets having a configuration characterized by a first wall portion extending substantially parallel to the saw head axis at the leading side of each tooth, a second wall portion extending substantially in the relation of a hypotenuse with respect to said first wall portion and a perpendicular thereto at the trailing side of each tooth for a major extent of the tooth spacing, and a third intermediate wall portion extending in truncating relation between said first and second wall portions; said teeth having a cutting tip disposed at a positive rake, and presenting a cutting edge which lies in a plane substantially perpendicular to the axis of said head portion and which is inclined from a radial plane containing the inner end of said cutting edge, said inclination being in a direction opposite to the direction of saw rotation at an angle which reduces the radial component of the sawing force to approximately half that which would be applied to a radial cutting edge; and the end face of said cutting tip at said cutting edge being inclined from said cutting edge plane in a direction opposite to the direction of feed of the tubular saw with the inner and outer side faces of said cutting tip conically tapered from said end face coaxially with respect to said head portion.

2. A tubular wood saw as defined in claim 1 and further characterized in that said first, second and third wall portions define a gullet profile area that materially exceeds the tooth profile area between adjacent gullets.

3. A tubular wood saw as defined in claim 1 and further characterized in that said cutting tip is disposed at a rake angle in the order of 24°, in that said end face of the cutting tip is inclined from said perpendicular plane at an angle in the order of 15°, and in that said conically tapered side faces are formed at a cone angle in the order of 6°.

4. A tubular wood saw capable of substantially improved operating speeds, feed rates and boring depths, said tubular saw including an annular head portion having regularly spaced teeth arranged to cut away an annular kerf and having deep gullets formed between said teeth, said gullets having a first wall portion extending substantially parallel to the saw head axis at the leading side of each tooth, a second wall portion extending substantially in the relation of a hypotenuse with respect to said first wall portion and a perpendicular thereto at the trailing side of each tooth for a major extent of the tooth spacing, and a third intermediate wall portion extending in truncating relation between said first and second wall portions, said first, second and third wall portions defining a gullet profile area that materially exceeds the tooth profile area between adjacent gullets.

5. A tubular wood saw as defined in claim 4 and further characterized in that each tooth of said head portion includes a cutting tip presenting a cutting edge which lies in a plane substantially perpendicular to the axis of said saw head and which is inclined from a radial plane containing the inner end of said cutting edge, said inclination being in a direction opposite to the direction of saw rotation at an angle which reduces the radial component of the sawing force applied thereto to approximately half that which would be applied to a radial cutting edge.

6. A tubular wood saw as defined in claim 4 and further characterized in that each tooth of said head portion includes a cutting tip presenting a cutting edge lying in a plane substantially perpendicular to the axis of said head portion, the end face of said cutting tip at said cutting edge being inclined from said cutting edge plane in a direction opposite to the direction of feed of the tubular saw, and the inner and outer side faces of said cutting tip being conically tapered from said end face coaxially with respect to said head portion.

References Cited

UNITED STATES PATENTS

| | | | |
|---|---|---|---|
| 42,445 | 4/1864 | Reid | 143—85 |
| 2,027,139 | 1/1936 | Abramson et al. | 145—120 |
| 2,062,257 | 11/1936 | Douglas et al. | 143—85 |
| 2,598,712 | 6/1952 | Meyers | 77—69 X |
| 2,947,206 | 8/1960 | Flanagan | 77—69 X |

DONALD R. SCHRAN, *Primary Examiner.*